US009378286B2

(12) United States Patent
Sloo et al.

(10) Patent No.: US 9,378,286 B2
(45) Date of Patent: Jun. 28, 2016

(54) IMPLICIT USER INTEREST MARKS IN MEDIA CONTENT

(75) Inventors: David Sloo, Menlo Park, CA (US); Peter Barrett, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 739 days.

(21) Appl. No.: 12/049,142

(22) Filed: Mar. 14, 2008

(65) Prior Publication Data

US 2011/0173194 A1 Jul. 14, 2011

(51) Int. Cl.
*G06F 3/048* (2013.01)
*G06F 17/30* (2006.01)

(52) U.S. Cl.
CPC ...... *G06F 17/30867* (2013.01); *G06F 17/3082* (2013.01); *G06F 17/30852* (2013.01)

(58) Field of Classification Search
CPC .................................. H04N 21/25883; H04N 2005/44565–2005/44578; H04N 21/44222–21/44245; G06F 17/30867
USPC .............. 707/705, 736, 741–751; 706/12–14, 706/45–61; 715/716
See application file for complete search history.

(56) References Cited

U.S. PATENT DOCUMENTS

| | | | | |
|---|---|---|---|---|
| 6,236,395 B1 * | 5/2001 | Sezan et al. | .................... | 715/723 |
| 6,486,892 B1 * | 11/2002 | Stern | .............................. | 715/760 |
| 6,662,177 B1 * | 12/2003 | Martino et al. | | |
| 6,698,020 B1 | 2/2004 | Zigmond et al. | | |
| 6,813,775 B1 * | 11/2004 | Finseth et al. | .................. | 725/46 |
| 7,624,416 B1 * | 11/2009 | Vandermolen | ......... | H04H 60/33 709/203 |
| 7,689,589 B2 * | 3/2010 | Wong | ................ | G06F 17/30864 707/999.107 |
| 7,783,622 B1 * | 8/2010 | Vandermolen | .... | G06F 17/30867 707/708 |
| 8,095,951 B1 * | 1/2012 | Kunkel | ..................... | H04N 5/76 725/37 |
| 8,132,103 B1 * | 3/2012 | Chowdhury | ...... | G06F 17/30056 715/720 |
| 8,176,191 B2 * | 5/2012 | Fischer | .................. | G06Q 50/01 705/319 |
| 8,364,669 B1 * | 1/2013 | Chowdhury | ...... | G06F 17/30038 707/726 |
| 8,387,093 B2 * | 2/2013 | Danker | .............. | H04N 5/44543 725/46 |

(Continued)

OTHER PUBLICATIONS

Frank Hopfgartner and Joemon Jose, "Evaluating the Implicit Feedback Models for Adaptive Video Retrieval", International Multimedia Conference, Sep. 2007, pp. 323-331, ACM, New York, NY, USA.*

(Continued)

*Primary Examiner* — Francisco Aponte
(74) *Attorney, Agent, or Firm* — Aaron Chatterjee; Kate Drakos; Micky Minhas

(57) ABSTRACT

Automatically marking locations of user interest in media content is disclosed. Data that describes user interaction with media content is analyzed to determine locations of potential interest. For each of the locations of potential interest, the data is analyzed to determine whether user interest satisfies a criterion for establishing a mark for the location. Marks are determined for those locations that satisfy the criterion. A mark includes a description for a given location and information that allows the given location to be automatically presented to a user upon selection of the description. In another aspect, extrinsic data that is separate from a piece of media content is analyzed to determine whether moments of high user interest might exist in the piece of media content. Then, the piece of media content is scanned to find locations in the media content that correspond to the moments.

15 Claims, 8 Drawing Sheets

(56) References Cited

U.S. PATENT DOCUMENTS

| | | | |
|---|---|---|---|
| 8,745,661 B2* | 6/2014 | Ellis | G06F 17/30038 725/139 |
| 9,201,627 B2* | 12/2015 | Tam | G06F 3/1454 |
| 2001/0049826 A1* | 12/2001 | Wilf | H04N 5/50 725/120 |
| 2002/0059644 A1 | 5/2002 | Andrade et al. | |
| 2002/0120925 A1* | 8/2002 | Logan | 725/9 |
| 2002/0174425 A1 | 11/2002 | Markel et al. | |
| 2003/0007092 A1* | 1/2003 | Sonner et al. | 348/463 |
| 2003/0067554 A1* | 4/2003 | Klarfeld et al. | 348/461 |
| 2003/0093790 A1* | 5/2003 | Logan et al. | 725/38 |
| 2004/0025180 A1* | 2/2004 | Begeja et al. | 725/46 |
| 2004/0073918 A1* | 4/2004 | Ferman et al. | 725/34 |
| 2004/0139047 A1 | 7/2004 | Rechsteiner et al. | |
| 2004/0218904 A1 | 11/2004 | Yoon et al. | |
| 2005/0094031 A1 | 5/2005 | Tecot et al. | |
| 2005/0114357 A1* | 5/2005 | Chengalvarayan et al. | 707/100 |
| 2005/0144635 A1 | 6/2005 | Boortz | |
| 2005/0154637 A1* | 7/2005 | Nair et al. | 705/14 |
| 2006/0010472 A1* | 1/2006 | Godeny | 725/62 |
| 2006/0015904 A1* | 1/2006 | Marcus | 725/46 |
| 2006/0080716 A1 | 4/2006 | Nishikawa et al. | |
| 2006/0200432 A1* | 9/2006 | Flinn et al. | 706/12 |
| 2006/0218573 A1* | 9/2006 | Proebstel | H04H 60/33 725/14 |
| 2007/0053653 A1 | 3/2007 | Huntington | |
| 2007/0061352 A1* | 3/2007 | Dimitrova et al. | 707/102 |
| 2007/0101394 A1* | 5/2007 | Fu et al. | 725/134 |
| 2007/0127887 A1 | 6/2007 | Yap et al. | |
| 2007/0154169 A1* | 7/2007 | Cordray et al. | 386/83 |
| 2007/0294295 A1* | 12/2007 | Finkelstein et al. | 707/104.1 |
| 2008/0133475 A1* | 6/2008 | Fischer | G06F 17/30867 |
| 2008/0140523 A1* | 6/2008 | Mahoney | G06Q 30/0256 705/14.54 |
| 2008/0155602 A1* | 6/2008 | Collet | H04N 21/235 725/46 |
| 2008/0232765 A1* | 9/2008 | Patten et al. | 386/52 |
| 2008/0307463 A1* | 12/2008 | Beetcher et al. | 725/53 |
| 2008/0313541 A1* | 12/2008 | Shafton et al. | 715/725 |
| 2009/0083141 A1* | 3/2009 | Craine | 705/14 |
| 2010/0161384 A1* | 6/2010 | Wells | G06Q 30/00 705/59 |

OTHER PUBLICATIONS

Customized Television: Standards Compliant Advanced Digital Television—Michel Bais,John Cosmas,Christoph Dosch, Andreas Engelsberg,Alexander Erk,Per Steinar Hansen,Pat Healey,Gunn Kristin Klungsoeyr,Ronald Mies,Jens-Rainer Ohm, Yakup Paker,Alan Pearmain,Lena Pedersen,Åsmund Sandvand, ainer Schäfer, Peter Schoonjans,Peter Stammnitz—Jun. 2002 IEEE.*

Hopfgartner, Evaluating the Implicit Feedback Models for Adaptive Video Retrieval, International Multimedia Conference, Sep. 2007, pp. 323-331, ACM, New York, NY, USA.

Marvin Nelson, editor, Interactive Television, DigiPoints the Digital Knowledge Handbook, Copyright 1999 by the Society of Cable Telecommunications Engineers Inc., vol. 3, issue 1, PA, USA.

* cited by examiner

| Media Mark<br>Descriptions | Time<br>Codes |
|---|---|
| Rams TD run: 49ers 0 – Rams 7<br>Rams TD pass: 49ers 0 - Rams 14<br>49ers return kickoff for TD<br>49ers field goal 49ers 10 – Rams 14<br>49ers block punt<br>Rams intercept pass<br>49ers TD: 49ers 17 - Rams 14<br>Truck Advertisement<br>Final play | 0:13:22<br>0:27:49<br>0:58:24<br>1:15:25<br>1:35:04<br>2:15:15<br>2:15:35<br>2:48:47<br>2:57:58 |

IMPLICIT USER INTEREST MARKS IN MEDIA CONTENT

BACKGROUND

When a user watches a piece of media content such as a movie, television show, or sports program, the user may wish to return a particular location in the media content that represents high user interest. Some media playing devices will remember the location at which the user stopped watching such that the user can easily pick up from exactly that location in the media content. For example, some DVD players will remember the location at which a user stopped watching a movie and automatically re-start playing the movie at that location. However, this technique is limited in that it only remembers a single location in the media content, as opposed to multiple locations of interest in the media content. Moreover, the location at which the user stopped watching does not necessarily reflect a location of high user interest. In contrast, that location might actually represent low user interest.

Some techniques allow users to explicitly create bookmarks, and thus may allow a user to mark locations of high user interest. For example, Internet browsers allow a user to explicitly create bookmarks for web pages visited by the user. The web browser adds a short written description of the web page to a list of bookmarks and associates a URL of the web page with the written description. Therefore, the user can revisit the web page during a later browsing session by selecting the written description from the list. While bookmarks created by a web browser may allow a user to mark web pages of high user interest, typically this technique requires the user to explicitly mark each web page. Having to create the bookmarks explicitly might be acceptable when a user is browsing the Internet because the user needs to perform other explicit actions anyway, such as moving on to another web page. Thus, the added action of explicitly creating a bookmark is not too onerous. However, for other applications having to explicitly mark a location of user interest could be quite tedious for the user.

SUMMARY

Techniques are disclosed herein for automatically marking locations of user interest in media content without an explicit user request to create the mark. For example, a user does not need to take any special actions to mark a location of high user interest when the user is engaged in playing a movie. Note that this technique alleviates the need for a user to take an explicit action at the very time that the user may not want to. Data that describes user interaction with media content is analyzed to determine which locations in the media content are potentially interesting to one or more users. For each of the locations of potential interest, the data is analyzed to determine whether user interest satisfies a criterion for establishing a mark for the location. Marks are determined for those locations that satisfy the criterion. Determining a mark for a given location includes determining a description for the given location and associating information with the description that allows the given location to be automatically presented to a user upon selection of the description for the given location.

In one aspect, the media content is scanned for locations that are expected to be of interest to a user based on a criterion that is associated with high user interest. After scanning the media content for locations that satisfy the criterion, a description is determined for those locations. Furthermore, each description is associated with information that allows the location in the media content to be automatically presented to a user upon selection of the description for the location.

In another aspect, rather than scanning the media content for locations of expected user interest, extrinsic data that is separate from a piece of media content is analyzed to determine whether moments of high user interest might exist in the piece of media content. Then, the piece of media content is scanned to find locations in the media content that correspond to the moments. More specifically, the extrinsic data is analyzed in order to determine moments of expected user interest in the piece of media content. Locations in the piece of media content that correspond to each of the moments of expected user interest are then determined. An identifier of each location is determined to allow each location in the media content to be determined. Furthermore, a unique description is associated with each identifier. The unique descriptions and the identifiers of the locations are provided to a user to enable selective viewing of portions of the piece of media content that correspond to the moments of expected user interest.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

General Overview

Figure 1:
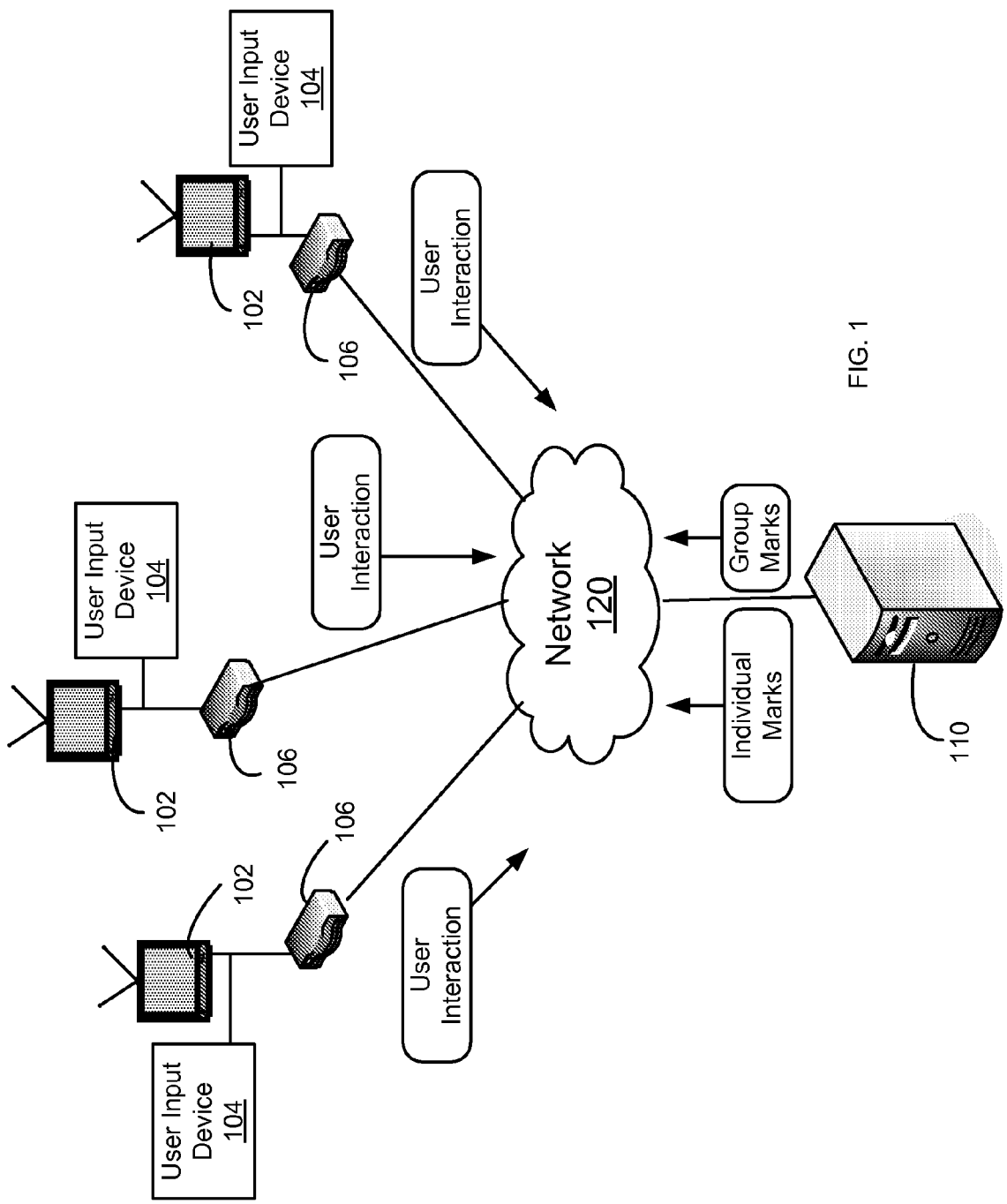
FIG. 1 depicts one embodiment of a system for automatically determining media marks.

Techniques are disclosed herein to help users easily access locations of high interest in media content. Examples of media content include, but are not limited to, television shows, audio-visual advertisements, movies, and broadcast sporting events. The media content can come from any source including, but not limited to, a cable broadcaster, a satellite broadcaster, a DVD, etc. The device that establishes the marks can be located at any point in the distribution system.

For example, a cable broadcaster or a set top box (STB) could establish the marks. In some cases, the locations that are marked in the media content pertain to something the user has already viewed. Thus, the user is allowed to easily view those locations again. However, in other cases the user might not have viewed that location. For example, the user might be aided in quickly accessing highlights of a sporting event that the user did not view.

To help the user access these locations of interest, "media marks" are automatically determined and provided to the user. As used herein, the term "media mark" refers to data that identifies a location in media content. A media mark has a description associated therewith that allows a user to easily understand what is being marked. An example format for a description is "name of television series," "episode title," "scene description." A media mark also has an identifier of the location being marked. As an example, an episode number of a television series and a time code within the episode identify the location. Thus, a media mark may identify a particular episode of a television series and a specific location in the episode.

When the user selects a media mark, the media content is automatically presented to the user starting at the correct location (conditioned upon the user having the media content available). Thus, a user can scan a list of the user's media marks to quickly access and view one or more scenes in their favorite television series. The user could also choose to distribute the media marks to another user to allow a friend to view the scenes.

The user does not need to explicitly request the creation of a particular media mark, although the media mark may be based on some user interaction with the media content that indicates the user has a high interest in a particular location in the media content. In order to keep the list of media marks to a manageable level, only those interactions that indicate a high interest level result in storing media marks. For example, a high interest level might be indicated by a user fast-forwarding for a substantial portion of the media content, stopping, re-winding for a small portion, and then playing. High interest may be especially likely if this scanning behavior only occurred once in a movie or other media content. However, if the user merely fast-forwards through each commercial break, then the user may not have a high interest in the parts of the show after the commercial breaks. That is, repetitive scanning behavior may only indicate that the user has a higher interest in the show than the commercials.

System Overview of Automatically Determining Media Marks

FIG. 1 depicts one embodiment of a system for automatically determining media marks and providing the media marks to users. Each user views, listens to, and/or reads the media content through a media presentation device 102. The media presentation device 102 is any device that is capable of presenting the media content to the user. Non-limiting examples include cathode ray tubes (CRTs), LCD screens, plasma screens, and audio speakers. The media presentation device 102 typically is able to present both audio and visual content, but could be limited to only audio or only video.

Each user also has a media receiver 106, which receives media content and sends signals to the media presentation device 102 in order to present the media content to the user. As non-limiting examples, the media receiver 106 could be a set top box (STB), television receiver, digital video recorder (DVR), digital versatile disc (DVD) player (also know as a digital video disc player), personal computer, video cassette recorder (VCR), cellular telephone, etc. The media presentation device 102 and media receiver 106 can be integrated into a single component; however, they are often separate components.

Some media receivers 106 receive the media content by receiving a signal that was transmitted from outside the media receiver 106. As non-limiting examples, the signal could be a cable television signal, satellite television signal, or electronic signal from an Internet connection. Alternatively, the media receiver 106 receives the media content by reading a storage medium such as a Digital Versatile Disc (DVD), Compact Disc (CD), flash memory, videocassette, etc. The storage medium can be either volatile or non-volatile.

In some embodiments, the server 110 provides the media content to the users. For example, the server 110 may form a part of a cable television distribution system. However, the server 110 could also be an Internet server that provides the users with media content. As examples, the network 120 may be a cable network transmission system or the Internet. However, as previously discussed, the users are not required to obtain the media content from the server 110.

The media receiver 106 and/or media presentation device 102 has a user input device 104 such as a remote control associated therewith. The users interact with the media content through the user input device 104. By interacting with the media content, it is meant that the user provides some input that affects the presentation of the media content. The input device 104 can interface with the receiver 106 or presentation device 102 in a number of ways including electronic signals transmitted over a wire, optical pulses transmitted over an optical fiber, electromagnetic signals transmitted at variety of wavelengths (e.g., infra-red, radio frequency), acoustic signals transmitted through air, etc. Examples of user input devices 104 include, but are not limited to, handheld remote controls, joysticks, keyboards, "mice", voice activated control units, etc.

The media marks are determined based on user interactions with the media content. Individual media marks are based on a single user's interactions. Group media marks are based on a group of users' interactions. The media marks can be determined by any device that has access to the user interactions. For example, the media marks may be determined by a media receiver 106, a media presentation device 102, or another device at the user's location. However, the media marks are often determined at a location remote from the user, such as server 110.

In order for the server 110 to determine the media marks, user interaction data are collected and transmitted to the server 110. In one embodiment, the media receiver 106 collects user interaction data and forwards it to the server 110. For example, the media receiver 106 is able to interpret certain signals submitted by the user through the user input device 104. As a particular example, a DVR can interpret a user's request to fast forward through a recorded program. The media presentation device 102 or another device at the user's location could also forward the user interaction data.

In addition, the server 110 is by itself able to collect information to determine media marks. For example, if the server 110 is streaming video to the user, the server 110 can collect information regarding a user's request to fast forward to a particular location in the streaming video.

In one embodiment, the server 110 analyzes the user interaction data to determine media marks. For example, the server 100 determines that a given user has a high interest in a particular advertisement or that the group of users has a high interest in a particular location in a movie. Then, the server 110 distributes the media marks to the user's electronic devices (e.g., 102, 104) where the media marks are stored. Note that distributing the media marks does not require a substantial data transfer in that the media content itself is not necessarily transferred. Alternatively, the media marks are stored on a database that is accessible by the server 110. A user can then read the list of media marks from any device that is able to access the server 110. For example, media marks that are created based on a user's home viewing activities could be accessed by the user at a coffee shop with Internet access.

In some embodiments, the server 110, the media receiver 106, and/or the media presentation device 102 execute computer readable instructions that are stored on computer readable media. Computer readable media can be any available media that can be accessed by the server 110, the media receiver 106, or the media presentation device 102. By way of example, and not limitation, computer readable media may comprise computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the computer readable instructions and which can accessed by the server 110, the media receiver 106, or the media presentation device 102.

Functional Overview of Automatically Determining Media Marks

Figure 2:
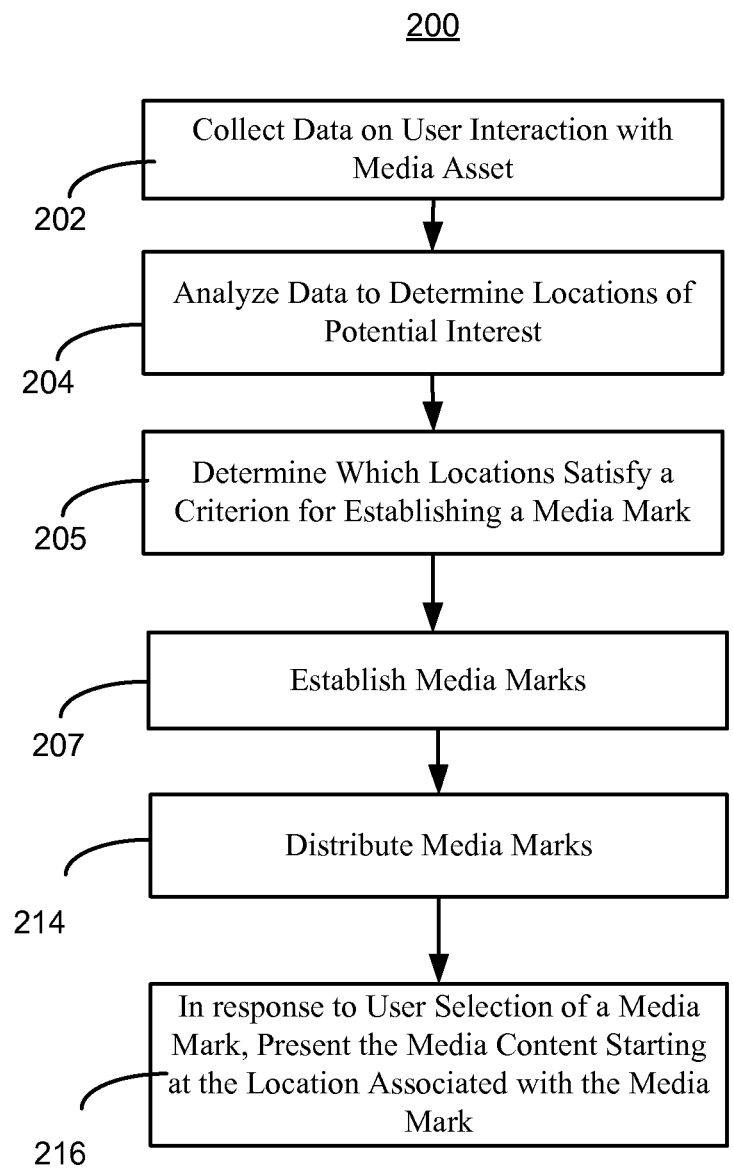
FIG. 2 is a flowchart depicting one embodiment of a process of automatically determining media marks.

FIG. 2 depicts a flowchart of one embodiment of a process 200 of automatically determining media marks. Process 200 may be implemented by either hardware or software, or a combination of hardware and software. Process 200 may be performed at any location in the chain that distributes the media content. For example, process 200 may be implemented by the server 110, the media receiver 106, or the media presentation device 102.

In one embodiment, process 200 is performed by executing computer-executable instructions, such as program modules. Generally, program modules include routines, programs, objects, components, data structures, etc. that perform particular tasks or implement particular abstract data types. Typically, the functionality of the program modules may be combined or distributed as desired in various embodiments.

Process 200 may be used to determine media marks based on a single user's media interactions or a group of users' media interactions. Herein, the term "user interactions" includes interactions of either one user or a group of users. In step 202, the user interaction data with the media content are collected. The data collected in step 202 can cover more than one piece of media. For example, the data could cover a time interval such as one continuous viewing period, one day, one week, etc. As another example, the data could cover a certain number of television episodes. In one embodiment, the data is broken down by type of media content (e.g., movies, television series, sports, news).

Step 204 is analyzing the data to determine one or more location of potential user interest. One technique for determining potential user interest is to identify a particular user interaction or a particular sequence of user interactions that correlate with high user interest. For example, user interactions of re-playing a particular scene multiple times might correlate to high user interest.

Figures 2A, 5:
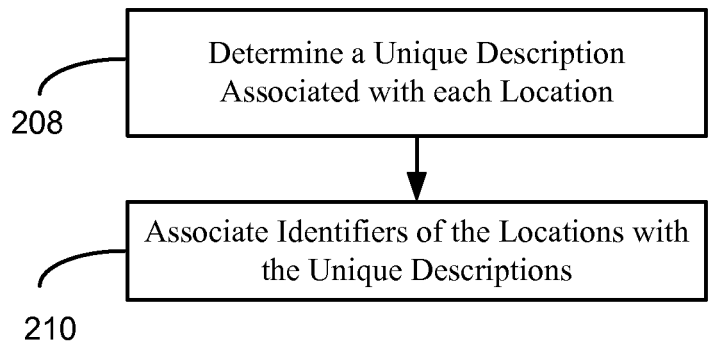
FIG. 2A is a flowchart depicting one embodiment of a process of establishing media marks.
FIG. 5 depicts an example description of media marks and associated location identifiers.
Figure 2B:
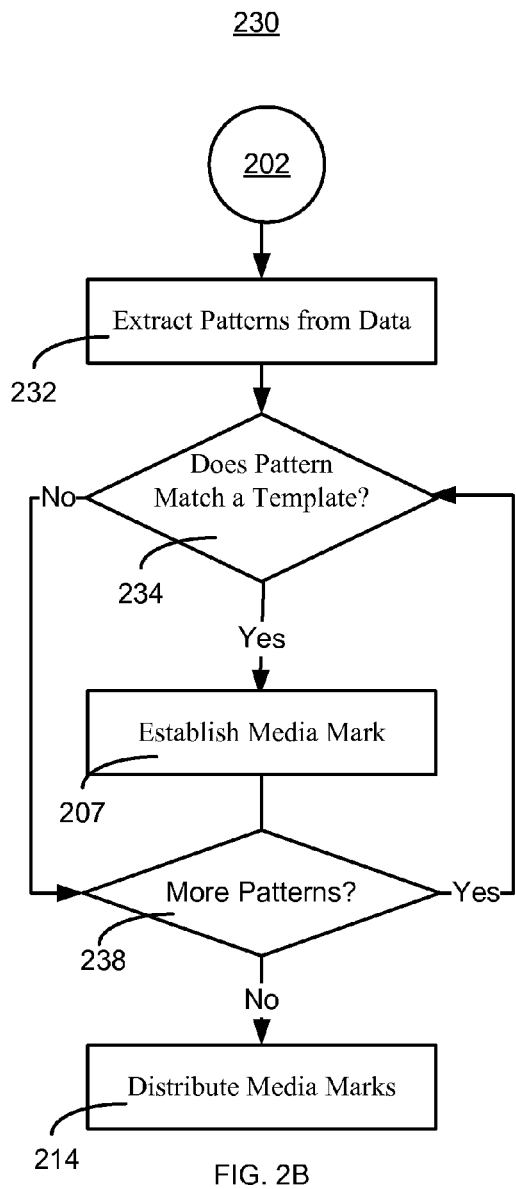
FIG. 2B is a flowchart depicting one embodiment of a process of determining whether to establish a media mark for a particular location.
Figure 2C:
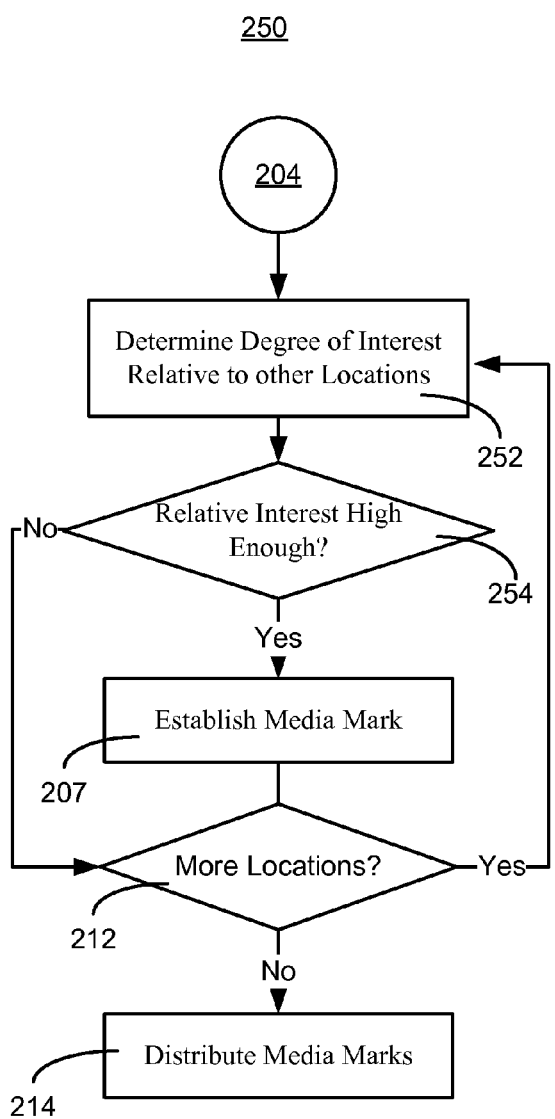
FIG. 2C is a flowchart depicting one embodiment of a process of determining whether to establish a media mark for a particular location.

In step 205, a determination is made as to which locations of potential use interest satisfy one or more criteria for establishing a media mark. Step 205 limits the establishment of media marks to those locations that have high user interest. Thus, process 200 does not automatically establish a media mark for each location of potential interest. Therefore, the users are not inundated with an enormous list of media marks. FIGS. 2B and 2C describe different techniques for implementing step 205.

In step 207, media marks are established for the locations that were determined in step 205. FIG. 5 depicts an example of media marks. Each media mark has a description that allows the user to easily understand what media content is marked. In the example of FIG. 5, each media mark has a time code that allows the media content to be retrieved. Other information that allows the media content to be retrieved (e.g., identifier of particular broadcast) is not shown in FIG. 5. Further details of establishing media marks is described in the discussion of FIG. 2A.

In step 214, the list of media marks are provided to the user or the group of users and stored in a computer readable medium at the user's location. Alternatively, the media marks are stored at the server 110.

In step 216, in response to user selection of one of the media marks, the media content is presented to the user starting at the location associated with the media mark. For example, in response to the user selecting the description "49ers return kickoff for TD," the user's presentation device 102 presents that football game starting at that scene. As one particular example, the server 110 streams video of the scene to the user's media receiver 106 in response to the server receiving notice of the user selection. As another example, the media marks are stored by a digital video recorder (DVR) at the user's location. The user causes the DVR to display the media marks on the presentation device 102, and in response to user selection of a media mark, the DVR causes the media content to be presented starting at the correct location.

Establishing Media Marks

FIG. 2A depicts one embodiment of a process 220 for establishing media marks. Process 220 is one technique for performing step 207 of process 200. In step 208 of process 220, a description is generated for each location of interest. In one embodiment, the description is automatically determined based on an analysis of the media content. For example, a name for a scene is determined based on metadata in the media content such as scene titles. However, the description may be determined based on an analysis of media content that is presentable to the user. For example, the description may be based on keywords extracted from closed captioning data. As another example, feature extraction may be used to determine a suitable description. An example of using feature extraction is to recognize characters (e.g., letters of alphabet) and extract a title that is presented when the user plays the media content. The description is added to a list of media marks that process 200 generates.

In step 210, an identifier of the correct media location is associated with each description. The identifier is used to automatically present the correct location in the media content to the user in response to the user selecting the media mark. The identifier contains information that uniquely identifies the piece of media content (e.g., television episode, movie), as well as a specific location in the media content (e.g., time code). Referring to FIG. 5, the identifiers include time codes that are extracted from the media content. The information that identifies the particular broadcast of the football game is not depicted in the example of FIG. 5.

Establishing Media Marks Based on Patterns of User Interaction

FIG. 2B is a flowchart of one embodiment of a process 230 of determining locations of potential interest and which of those locations should have a media marks established. Process 230 can be performed by the server 110 or an electronic device at the user's location. Process 230 begins after the data collection step 202 of process 200.

In step 232, patterns are extracted from the collected data. As an example, an extracted pattern could be a sequence of actions involving the user hitting any of a certain group of buttons on a remote. As a particular example, the group of buttons includes fast forward, re-wind, and play. In addition to what button the user selected, further details regarding the selection of the buttons may be collected. For example, the length of media content the user fast-forwarded through may be noted. Moreover, a location in the media content associated with the user input occurred is noted. Therefore, the location of potential interest may be determined. In the example in which the pattern is a sequence of actions, one of the actions may be interpreted as being associated with high user interest. For example, the location at which the user started playing may be considered the location of potential interest in the present example. Note that since a location in the content is associated with the extracted pattern, step 232 is one technique for performing step 204 of process 200 of determining locations of potential user interest in the media content.

In step 234, the extracted pattern is compared with one or more stored templates to determine whether there is a match. The stored templates are designed to reflect patterns that indicate a high level of user interest. As an example, a template could be fast-forwarding for at least a given portion of the media content, re-winding and then playing. If the extracted pattern matches one of the stored templates, then a media mark is established by control transferring to step 207 to establish a media mark. Step 234 is one technique for performing step 205 of process 200 of determining whether a location of potential interest warrants establishing a media mark.

If there are more patterns to be examined (step 238), control passes to step 234 to consider the next extracted pattern. When there are no more patterns to be considered, control passes to step 214 to distribute the media marks to the user(s). In one embodiment, the media marks are stored in a computer readable medium at the user's location. Alternatively, the media marks are stored at the server 110 and distributed to the user upon request.

Establishing Media Marks Based on Relative Degree of Interest in Various Locations In one embodiment, the determination of which locations of potential user interest to establish media marks for is made by comparing the degree of user interest in various locations. Establishing media marks in this manner helps to prevent establishing too many marks or too few marks. For example, a user that frequently skips around to different locations in the media content could otherwise end up with too many media marks to be useful to the user. Process 250 of FIG. 2C begins after step 204 of process 200 of determining locations of potential user interest. Process 250 describes one technique for performing step 205 of process 200.

In step 252, the degree of user interest in a particular location is compared to the degree of interest in other locations. In one embodiment, the degree of interest in each location is assigned a value for comparison purposes. One technique for determining a degree of interest was discussed in the example of extracting patterns; however, other techniques can be used. For example, if patterns are extracted as in the example of process 230, each pattern can be assigned a value based on the stored template it matches. Patterns that do not match any templates are assigned a value of zero.

Note that if the collected data are broken down by type of media content, then the comparison of step 252 may be performed with the data for one or more of the data sets. For example, the data for user interactions with television shows might be compared with only the data for television shows. However, a different data set, such as the data set for movies might be used as well. In the latter case, a different weight can be placed on interactions from one data set. For example, based on a statistical analysis it may be determined that users interact more frequently when viewing television shows than movies. Therefore, a particular user interaction when viewing a movie might indicate a higher level of interest than the same interaction for a television show.

Step 254 is determining whether the degree of interest in the current location is high enough relative to the interest in other locations to warrant establishing a media mark. Media marks are only established for those locations that are assigned values that are high relative to other locations. A wide variety of techniques can be used to select which locations have a high enough interest relative to other locations. In one embodiment, an upper limit is established such that no more than a certain number of media marks are established per unit of analysis. As examples, a limit can be placed on media marks per television episode, series, an evening's viewing, weekly viewing, etc. In one embodiment, an upper limit is placed on the percentage of media marks that are established per unit of analysis. Lower limits may be used as well.

If the relative degree of interest is high enough (step 254), then control passes to step 207 to establish a media mark. If the relative degree of interest is not high enough relative to other locations, then a media mark is not established and control passes to step 212.

If there are more locations to consider (step 212), then control passes to step 252 to consider the next location of potential user interest. After all locations of potential interest have been analyzed, control passes to step 214 to distribute the media marks. In one embodiment, the media marks are stored in a computer readable medium at the user's location. Alternatively, the media marks are stored at the server 110 and distributed to the user upon request.

Establishing Group Media Marks

As previously mentioned, in one embodiment group media marks are established. When establishing group media marks the user interaction data is typically collected at the server 110; however, the information could be collected at another location. When determining group media marks it is not required that each user displays an interest in a particular location. Rather, a group media mark is established when the collective interest of users is high enough. Whether the collective interest is high enough can be determined by assigning a value to the interest level of each user. If the combined values are greater than a threshold amount, a group media mark is established. The threshold may be based on the number of users in the group.

In one embodiment, the collective user interest in one location is compared to the collective user interest in other locations such that marks are only established for the most interesting locations.

Figure 3:
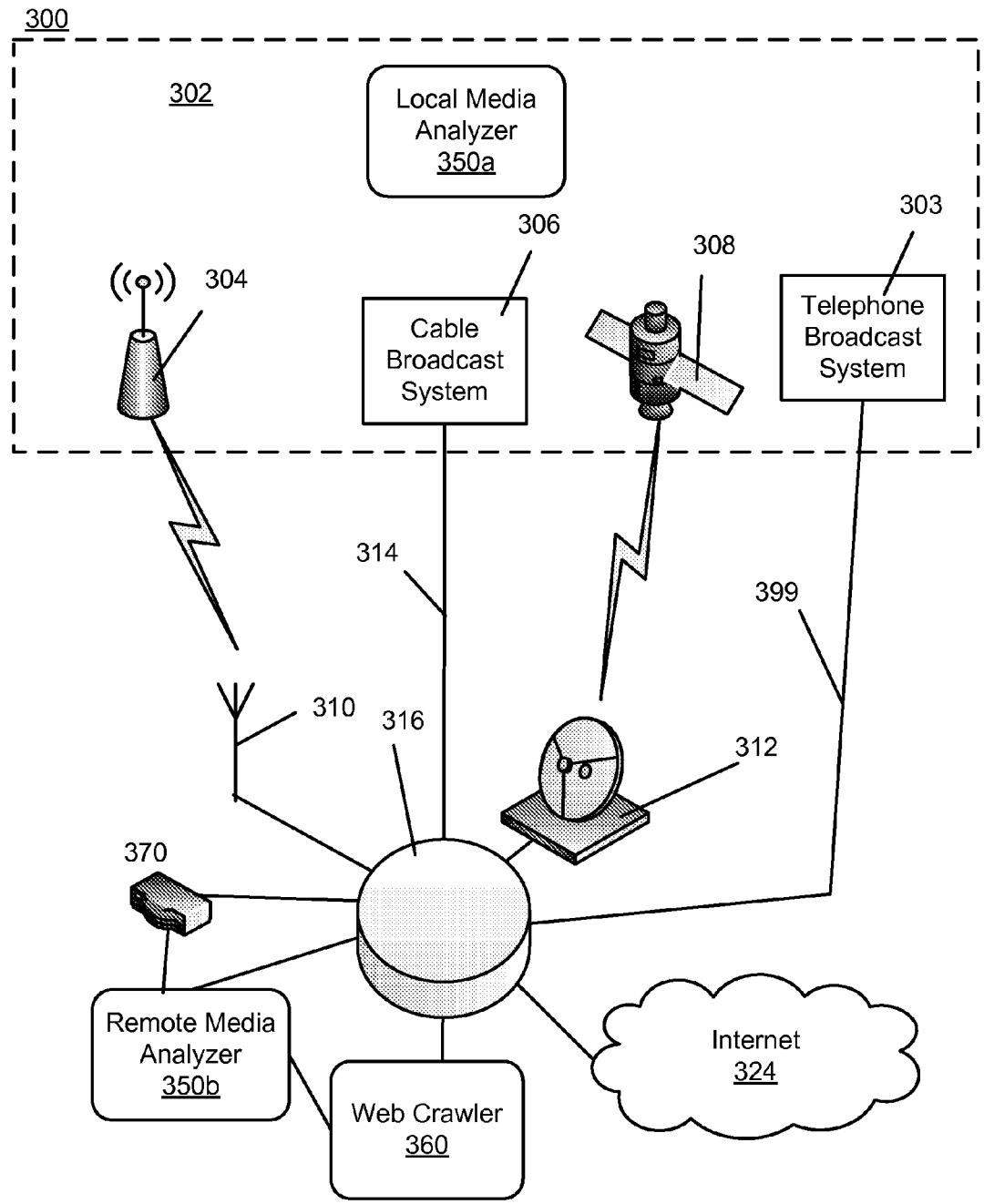
FIG. 3 depicts one embodiment of a system having media analyzers that automatically determine media marks.

Automatically Determining Media Marks Based on Analysis of Extrinsic Information In not all cases are the media marks generated based on user interaction with the media content. In one embodiment, media marks are automatically determined for the media content that the user has not necessarily viewed. FIG. 3 depicts a system having media analyzers 350 that automatically determine media marks.

In one embodiment, the media analyzer 350 analyzes extrinsic information to determine key moments that are expected to be found in the media content. The key moments are determined by the media analyzer 350 without any analysis of the media content itself. After determining the key moments, the media analyzer 350 determines what locations in the media content correspond to the key moments. For example, the media analyzer 350 reads a sports box score to determine when touchdowns or other key moments occurred and then scans the media content to find the location in the media content at which the touchdowns occurred.

The term extrinsic information as used herein means any information that is not contained in a data file or data stream that contains the media content itself. An example of extrinsic information is a summary of a sporting event that describes key moments such as when scores occurred. As a particular example, the extrinsic information might be a summary on the Internet that provides the time at which key moments such as scoring occurred. Another example of extrinsic information is a written review of a television show or movie that describes key moments. In one embodiment, the web crawler 360 provides the media analyzer 350 with extrinsic information from Internet web sites.

However, the media analyzer 350 does not always use extrinsic information to determine key moments. In one embodiment, the media analyzer 350 scans media content for information that is expected to be of high interest to a particular user, group of users, or users in general. As one example, the media analyzer 350 scans for news stories involving a user's home city. As another example, the media analyzer 350 scans for the laugh track in a comedy show reaching a particular threshold. Note that is these latter two examples, a key moment has not been established prior to scanning the media content.

A media analyzer 350 can be located in various parts of the system. One possible location for a media analyzer 350 is at the media content distribution point to allow direct access to the media content. An example of this is the local media analyzer 350a at the distributor 302.

FIG. 3 also shows a remote media analyzer 350b. A remote media analyzer 350b might be located at a user's location, readily allowing focusing the analysis on one particular user or small group of users. To access media content from a wide variety of content sources 302, the remote media analyzer 350b is connected to a local network 316 that includes a receiving television antenna 310 that receives signals from broadcast television antenna 304; a satellite dish 312 that receives signals from satellite broadcast system 308, a cable link 714 that receives signals from cable broadcast system 306; and a telephone switching system 399 that receives signals from telephone broadcast system 303.

The remote media analyzer 350b is also able to obtain media content from the Internet 324. For example, the remote media analyzer 350b may acquire a digital download of a television program. Furthermore, the remote media analyzer 350b is connected to a media player 370 that plays recordings of media content. In one embodiment, the media player 370 is a digital recorder that records media that was accessed from the local network 316. In another embodiment, the media player 370 plays pre-recordings such as DVDs, CDs, etc. While not depicted in FIG. 3, the local media analyzer 350a can have similar connections as the remote media analyzer 350b.

In some embodiments, the media analyzer 350 executes computer readable instructions that are stored on computer readable media.

Establishing Media Marks based on Extrinsic Information

Figure 4:
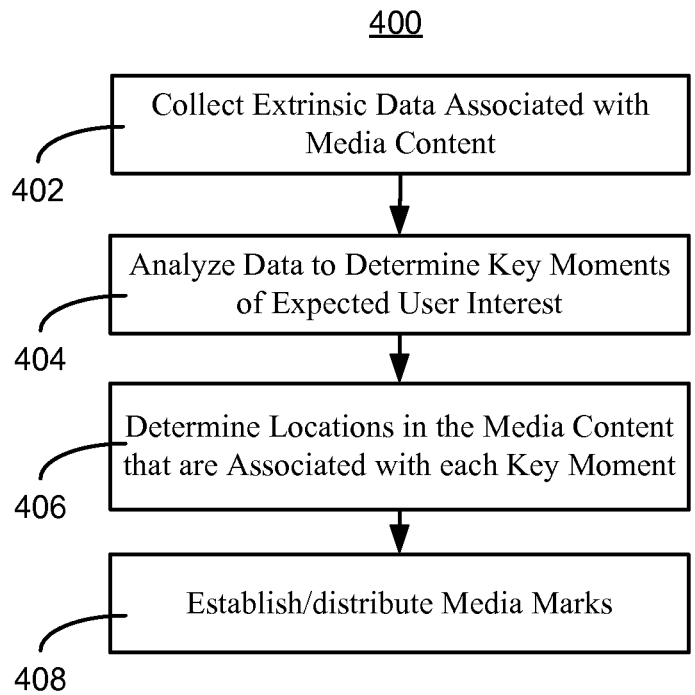
FIG. 4 depicts one embodiment of a process of determining media marks based on an analysis of extrinsic information.

FIG. 4 depicts one embodiment of a process 400 of determining media marks based on an analysis of extrinsic information to determine key moments that are expected to be of high user interest. In one embodiment, process 400 is performed by the media analyzer 350. In step 402, extrinsic information that is associated with a piece of media content is collected. In one embodiment, the extrinsic information is collected automatically by the web crawler 360 (also known as a web spider or web robot). For example, the web crawler obtains a "box score" that indicates when scores occurred in the football game that is the subject of the piece of media content. Note that the content owner of the box score may be different than the content owner of the media content.

In step 404, the media analyzer 350 analyzes the extrinsic information to determine moments of expected interest in the piece of media content. Expected points of interest could include, but are not limited to, scores in a sporting event and scenes in a movie or television episode. If desired, some of the key moments can be eliminated to reduce the number of media marks. However, in some embodiments it may be desirable to have a comprehensive list of points of expected interest.

In step 406, specific locations in the media content that correspond to the key moments are identified. In one embodiment, the locations are determined semi-automatically. For example, the media analyzer 350 calculates the approximate location in the media content based on the game time of a scoring event. Then, a user quickly fine tunes the location based on a visual scan of the media content. In one embodiment, the media analyzer 350 automatically determines the locations without any user intervention. For example, televised sporting events usually contain a clock showing the game time, which can be extracted using feature extraction techniques that are known in the video processing arts. Feature extraction can also be used to look for patterns such as a referee with arms held to indicate "touchdown". Once the location has been found, an identifier of the location is saved such that the location can be retrieved easily at a later time. As an example, a time code that is already embedded in the video is used to identify the location.

As described above, the piece of media content is typically identified prior to collecting and analyzing the extrinsic information. However, in one embodiment, the piece of media content is not identified prior to collecting and analyzing the extrinsic evidence. Rather, a piece of media content that corresponds to the extrinsic data is determined in step 406. For example, if the extrinsic information describes a football game, then the media analyzer 350 locates a particular broadcast of the football game described in the extrinsic information.

In step 408, the media analyzer 350 establishes media marks for at least a subset of the key moments. Those media marks are then distributed to the user(s). FIG. 5 is an example description of media marks. Each media mark also has associated therewith an identifier of some piece of media and location within the media.

Scanning Media Content to Establish Media Marks

Figure 6:
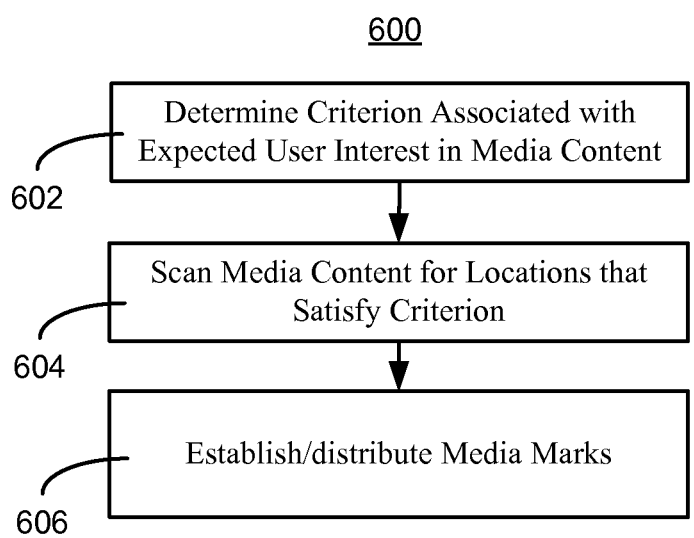
FIG. 6 depicts one embodiment of a process of determining media marks by scanning media content.

FIG. 6 depicts one embodiment of a process 600 of scanning media content for a location whose content satisfies a criterion in order to determine locations to establish media marks. In one embodiment, the criterion is based on a user attribute such as the user's home or business address, special interests, education, vocation, club memberships, etc. As an example, a newscast is scanned to locate stories pertaining to the user's city. In another embodiment, the criterion is selected to be of interest to users in general. For example, the criterion might be a certain level of laughter in a laugh track in a situation comedy, or an explosion in a movie. Note that the techniques can be combined. For example, user preferences can be used as a basis for whether to scan for laughter or explosions. In one embodiment, process 400 is performed by the media analyzer 350.

In step 602, the media analyzer 350 determines a criterion that is associated with high user interest in media content. In one embodiment, the criterion is specific to the user. For example, the user might be highly interested to know that a news report involving an address near the user's home was broadcast. In one embodiment, the criterion is learned from a user profile such as a profile the user has with a media content provider. In one embodiment, the extrinsic information is collected from an electronic device at the user's locale. For example, the electronic device can store information regarding the user's viewing habits or preferences.

In step 604, the media analyzer 350 scans media content for locations that satisfy the criterion in media content. The media analyzer 350 can scan for data that might be presented to the user during presentation, such as audio, visual, optional text, etc. As an example, the media analyzer 350 can scan the closed captioning of a news broadcast or other television show for information that might be of high interest to a particular user. In one embodiment, the media analyzer 350 performs a statistical analysis of data that is normally presented to the user. For example, the media analyzer 350 scans for locations in the media content at which the laugh track is especially loud. The media analyzer 350 might also analyze the colors in the video or perform feature extraction (e.g., face detection). The media analyzer 350 factors in user attributes with the statistical analysis (e.g., volume of laugh track) to identify locations that satisfy the criterion, in one embodiment. The media analyzer 350 may also scan for data that is not normally presented to the user during presentation, such as metadata associated with the media content.

In step 606, media marks are established for the locations that satisfy the criterion in media content. Those media marks are then distributed to the user(s).

Example Broadcast Electronic Device

Figure 7:
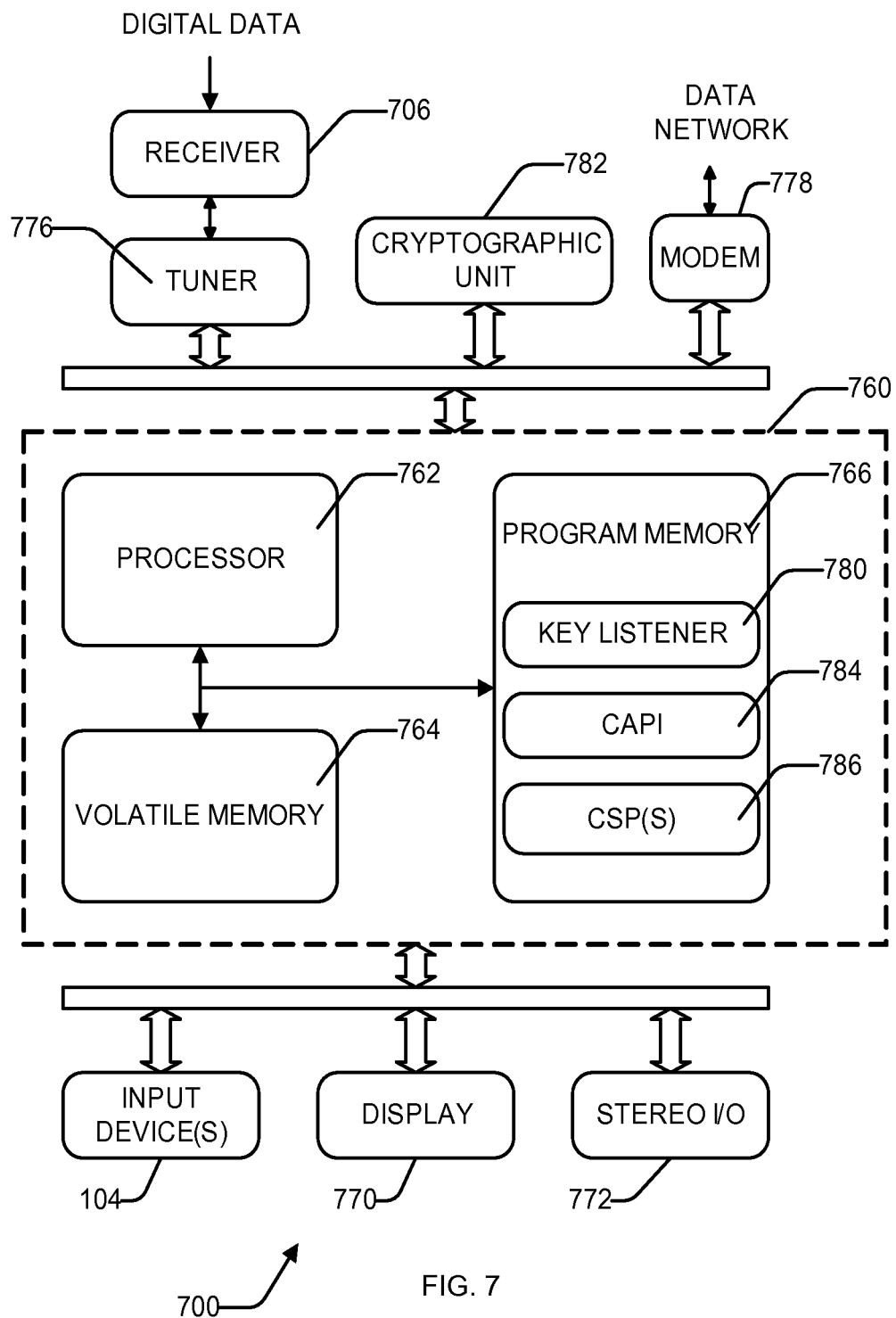
FIG. 7 shows an example configuration of a broadcast-enabled electronic media device that may serve as a platform for embodiments of the present invention.

At least some of the embodiments disclosed herein may be implemented on a media device that a user interacts with when viewing media content. FIG. 7 shows an example configuration of a broadcast-enabled electronic media device 700 having user input device(s) 104 allowing user interaction with media content. In one embodiment, the device 700 serves as a platform for the media receiver 106, the media presentation device 102, and the user input device 104. Device 700 includes a central processing unit 760 having a processor 762, volatile memory 764 (e.g., RAM), and program memory 766 (e.g., ROM, Flash, disk drive, floppy disk drive, CD-ROM, etc.). The device 700 has one or more input devices 104 (e.g., keyboard, mouse, etc.), a video display 702 (e.g., VGA, SVGA), and a stereo I/O 772 for interfacing with a stereo system.

The device 700 includes a digital broadcast receiver 706 (e.g., satellite dish receiver, RF receiver, microwave receiver, multicast listener, etc.) and a tuner 776 which tunes to appropriate frequencies or addresses of the broadcast network. The tuner 776 is configured to receive digital broadcast data in a particularized format, such as MPEG-encoded digital video and audio data, as well as digital data in many different forms, including software programs and programming information in the form of data files. The device 700 also has a modem 778 which provides dial-up access to the data network 728 to provide a back channel or direct link to the server 110. In other implementations of a back channel, the modem 778 might be replaced by a network card, or an RF receiver, or other type of port/receiver which provides access to the back channel.

The device 700 runs an operating system which supports multiple applications. The operating system may be a multi-tasking operating system which allows simultaneous execution of multiple applications. The operating system may employ a graphical user interface windowing environment which presents the applications or documents in specially delineated areas of the display screen called "windows."

The device is illustrated with a key listener 780 to receive the authorization and session keys transmitted from the server 110. The keys received by listener 780 are used by the cryptographic security services implemented at the device 700 to enable decryption of the session keys and data. Cryptographic services are implemented through a combination of hardware and software. A secure, tamper-resistant hardware unit 782 is provided external to the CPU 760 and two software layers 784, 786 executing on the processor 762 are used to facilitate access to the resources on the cryptographic hardware 782.

The software layers include a cryptographic application program interface (CAPI) 784 which provides functionality to any application seeking cryptographic services (e.g., encryption, decryption, signing, or verification). One or more cryptographic service providers (CSPs) 786 implement the functionality presented by the CAPI to the application. The CAPI layer 784 selects the appropriate CSP for performing the requested cryptographic function. The CSPs 786 perform various cryptographic functions such as encryption key management, encryption/decryption services, hashing routines, digital signing, and authentication tasks in conjunction with the cryptographic unit 782. A different CSP might be configured to handle specific functions, such as encryption, decryption, signing, etc., although a single CSP can be implemented to handle them all. The CSPs 766 can be implemented as dynamic linked libraries (DLLs) that are loaded on demand by the CAPI, and which can then be called by an application through the CAPI 784.

Example Computing Platform

Figure 8:
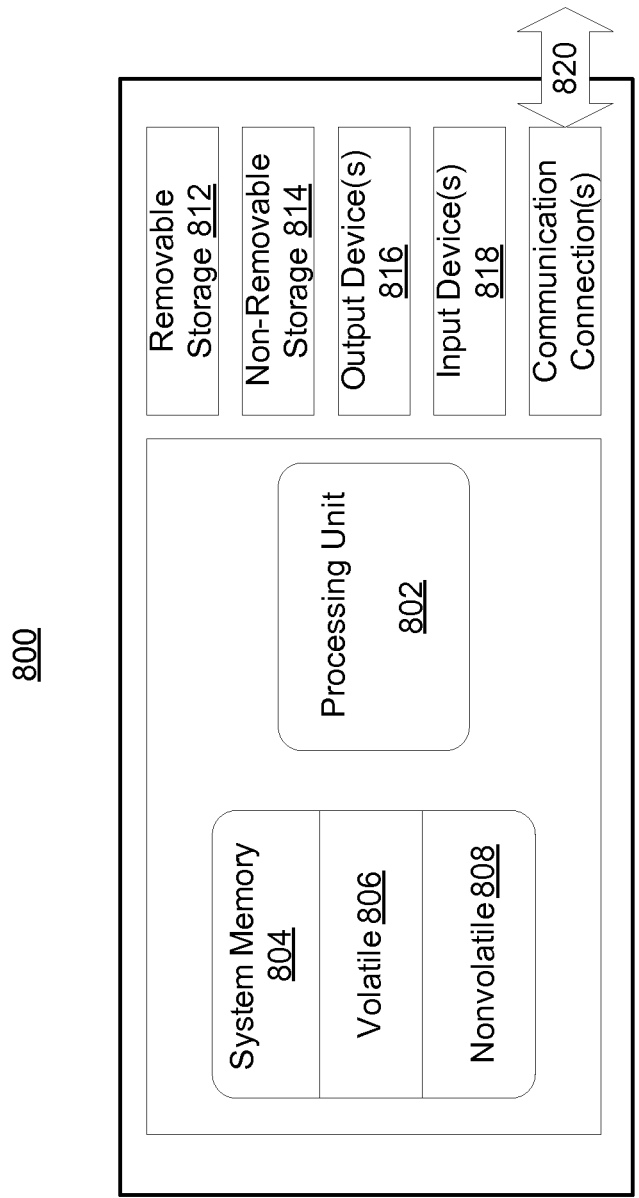
FIG. 8 depicts an example computer that may serve as a platform for embodiments of the present invention.

FIG. 8 depicts an example computer system 800 that may serve as a platform for embodiments of the present invention. The server 110 may be implemented with such a computer platform. The example platform may also be used to implement user electronic devices (e.g., media presentation device 102 and media receiver 106). In its most basic configuration, the computer 800 typically includes a processing unit 802 and memory 804. Depending on the exact configuration and type of computing device, memory 804 may be volatile (such as RAM), non-volatile (such as ROM, flash memory, etc.) or some combination of the two. Additionally, computer 800 may also have mass storage (removable 812 and/or non-removable 814) such as magnetic or optical disks or tape. Similarly, computer 800 may also have input devices 818 such as user input device (FIG. 1, 104) and/or output devices 816 such as media presentation device (FIG. 1, 102). Other aspects of device 800 may include communication connections 820 to other devices, computers, networks, servers, etc. using either wired or wireless media. For example, the server 110 and the media receiver 106 may have a network connection to each other.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer implemented method of providing marks associated with media content, said method comprising:
    automatically searching extrinsic information over a network for a summary description of an event, the summary description stating times in the event at which respective key moments occurred in the event;
    automatically analyzing said summary description of the event in order to determine whether moments of high user interest might exist in a piece of media content that contains the event;
    accessing audio/video content of the event, wherein the summary description of the event is derived independently from user interaction with audio/video content of the event;
    determining locations in the accessed audio/video content that correspond to each of the moments of high user interest, including scanning the accessed audio/video content to find locations in the accessed audio/video content that correspond to the times in the event at which respective key moments occurred in the event, wherein the times in the event are independent of elapsed time in the accessed audio/video content;
    determining an identifier of each of the locations, said identifier for a given location allows the given location to be determined by an electronic device;
    associating a unique description with each of the identifiers; and
    providing the unique descriptions and the identifiers of the locations to at least one user electronic device to enable selective viewing of portions of the audio/video content that correspond to the moments of high user interest.

2. The computer implemented method of claim 1, wherein the searching extrinsic information for the summary description of the event includes:
    accessing the summary description from a first content provider that is distinct from a second content provider that provides the accessed audio/video content.

3. The computer implemented method of claim 2, wherein the searching extrinsic information for the summary description of the event includes:
    automatically performing a Web search to locate the summary description of the event.

4. The computer implemented method of claim 1, further comprising:
    analyzing the accessed audio/video content to determine the unique description that is associated with each of the identifiers.

5. The computer implemented method of claim 1, further comprising:
    analyzing the summary description of the event to determine the unique description that is associated with each of the identifiers.

6. The computer implemented method of claim 1, wherein the determining locations in the accessed audio/video content that correspond to each of the moments of high user interest that might exist in the piece of media content includes using feature extraction to locate the moments of high user interest that might exist in the piece of media content.

7. The method of claim 1, wherein automatically analyzing said summary description of the event in order to determine whether moments of high user interest might exist in a piece of media content that contains the event comprises:
    automatically reading a sports box score to determine at what time in the event scores or other key moments occurred.

8. A system comprising:
    processor readable storage that stores instructions; and
    a processor in communication with the processor readable storage, wherein the instructions which when executed on the processor cause the processor to:
    automatically search extrinsic information for a summary description of an event;
    automatically analyze said summary description of the event in order to determine key moments in the event, the summary description stating times in the event at which the respective key moments occurred in the event;
    access audio/video content of the event, wherein the audio/video content is independent from the extrinsic information;
    determine a location in the audio/video content that corresponds to each of the key moments in the event, including causing the processor to scan the audio/video content to find locations in the audio/video content that correspond to the times in the event at which the respective key moments occurred, the times in the event being independent of elapsed time in the audio/video content;
    determine an identifier of each of the locations, said identifier for a given location allows the given location to be determined by an electronic device;
    associate a unique description with each of the identifiers; and
    provide the unique descriptions and the identifiers of the locations to at least one user electronic device to enable selective viewing of portions of the audio/video content that correspond to the key moments in the event.

9. The system of claim 8, wherein the times in the summary description are game times of a sporting event.

10. The system of claim 8, wherein the summary description of the event is a sports box score.

11. The system of claim 8, wherein the instructions that cause the processor to automatically search extrinsic information for a summary description of the event cause the processor to automatically perform a Web search to locate the summary description of the event.

12. The system of claim 8, wherein the summary description of the event is derived independently of both user interaction with audio/video content of the event and user commentary about the event.

13. A media analyzer comprising:
    an interface connected to a network; and
    a processing unit connected to the interface, wherein the processing unit is configured to:
    perform a search over the network for a summary of an event;
    analyze the summary of the event in order to determine key moments of expected user interest in the event, said summary stating times in the event at which the key moments occurred in the event;

access audio/video content of the event over the network, wherein the summary is derived independently from user interaction with audio/video content of the event;

scan the audio/video content to find locations that correspond to the key moments of expected user interest in the event, including the processing unit configured to scan the audio/video content to find locations in the audio/video content that correspond to the times in the event at which the key moments occurred, wherein the times in the event are independent of elapsed time in the audio/video content;

establish a media mark for each of the locations that correspond to the key moments of expected user interest in the event, wherein the media mark for a given key moment of expected user interest has a unique description of the key moment of expected user interest and an identifier of the location of the key moment of expected user interest; and provide the media mark of each of the locations over the network to a user electronic device.

14. The media analyzer of claim 13, wherein the times in the summary are game times in a sporting event.

15. The media analyzer of claim 13, wherein the summary description of the event is derived independently of both user interaction with audio/video content of the event and user feedback about the audio/video content.

\* \* \* \* \*